United States Patent Office 3,652,539
Patented Mar. 28, 1972

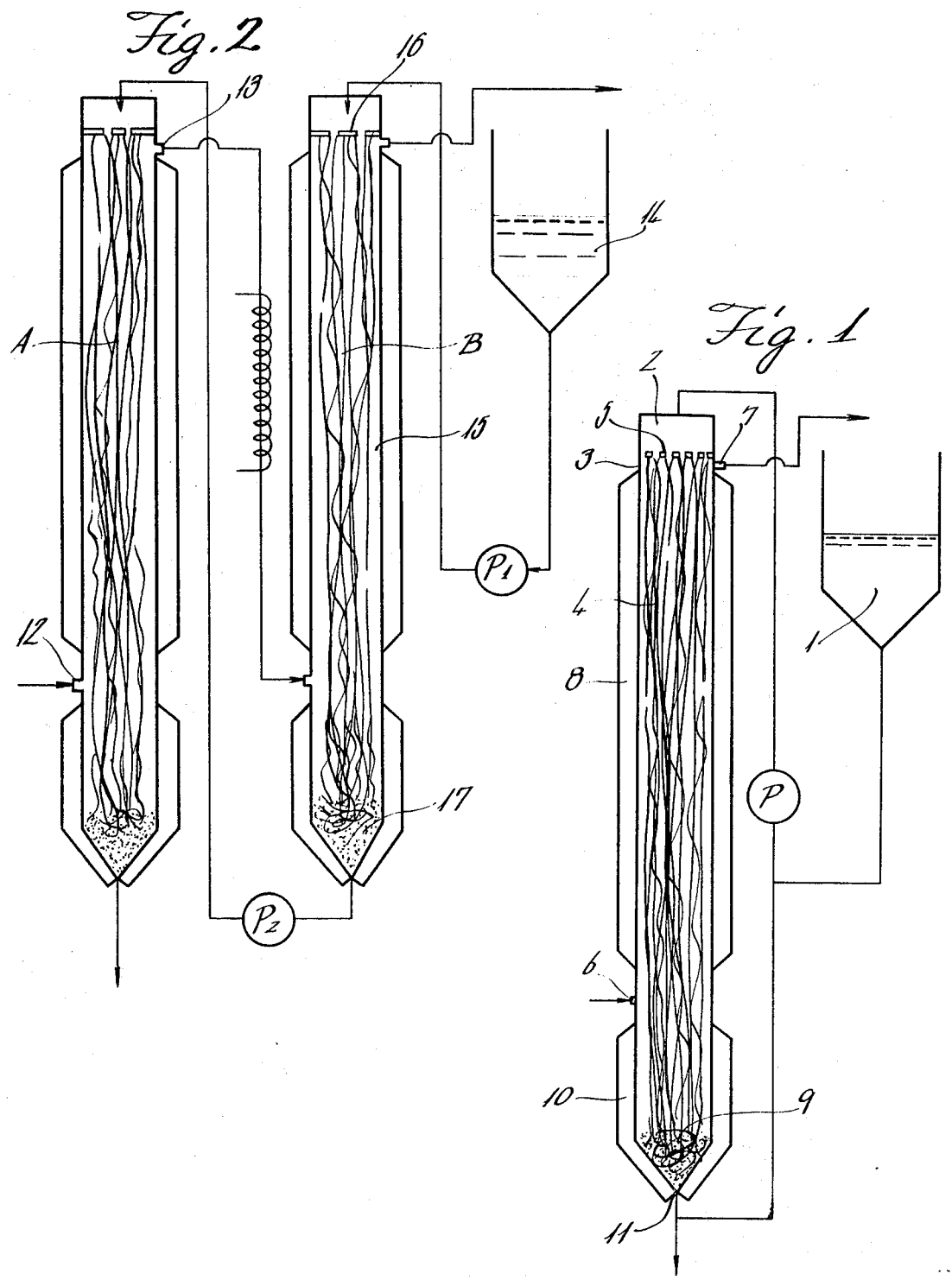

3,652,539
PROCESS FOR THE PRODUCTION OF
HYDROXYPROPYL CELLULOSE
Kabuo Miura, Schichitaro Sekigawa, and Kyosaku Nishizawa, Niigata, and Kazuo Nishimura, Tokyo, Japan, assignors to Nippon Soda Co., Ltd., Tokyo, Japan
Filed Mar. 9, 1970, Ser. No. 17,726
Int. Cl. C08b 11/08, 11/20
U.S. Cl. 260—231 R          1 Claim

ABSTRACT OF THE DISCLOSURE

Alkali cellulose is allowed to react with 20–80% of total moles of propylene oxide and after the reaction, 60–90% of alkali component in the reaction mixture is neutralized with acid and then the remaining propylene oxide is reacted further with alkali cellulose and the remaining alkali component is finally neutralized. The produced hydroxypropyl cellulose has good solubility properties for cold water and for many kinds of organic solvents.

DETAILED EXPLANATION OF THE INVENTION

This invention relates to an improvement in the process for the production of hydroxypropyl cellulose, and more particularly concerns a process for the production of hydroxypropyl cellulose which is soluble in cold water and many kinds of organic solvents.

It has heretofore been proposed to react alkali cellulose with propylene oxide continuously either at a temperature of 120–160° C. or at a temperature below 45° C. until hydroxypropyl cellulose having the desired content of ether groups is obtained. However, in this prior art one-step process, the hydroxypropyl cellulose produced is not soluble in cold water nad organic solvents. For instance even the hydroxypropyl cellulose having PO/glucose mole ratio more than 14 (which is defined as an average mole ratio of mole number of propylene oxide adding to one glucose unit of cellulose) is insoluble in iso-propyl alcohol and tertiary-butyl alcohol.

As for purification of the hydroxypropyl cellulose, in the prior art process, dissolution of the hydroxypropyl cellulose in cold water, gelatinization by heating the solution and centrifugal separation of the gel are repeated a few or several times in that order. However the repeating of these operations is very troublesome because of the strong adhesive properties of the gel.

Accordingly, it is an object of this invention to provide hydroxypropyl cellulose having good solubility properties in cold water and in many organic solvents including tertiary-butyl alcohol and iso-propyl alcohol.

It is another object of this invention to provide hydroxypropyl cellulose which has fine properties and high purity which can be used in food, cosmetics and drugs for use as a coating agent, binder, emulsifier, film former, protective colloid, stabilizer, suspending agent, thickener and other additives.

It is also an object of this invention to provide a continuous method for purifying hydroxypropyl cellulose with high yields without using centrifugal separation.

Other objects and advantages of this invention will become more readily apparent from the following detailed description when taken together with the accompanying drawing in which: FIG. 1 and FIG. 2 are schematic diagrams of the preferred purification arrangement contemplated herein.

In the simplest and most general form of the process of the invention, 20–80%, preferably 50–80% of the desired total amount of propylene oxide, which is required to make hydroxypropyl cellulose having the desired PO/glucose mole ratio, is reacted with alkali cellulose and 60–90% or preferably 70–80% of alkali component in the adduct is then neutralized. After semi-neutralization in this addition reaction, the remaining portion of propylene oxide is further reacted with the adduct to the extent that the adduct has the desired PO/glucose mole ratio. Finally the remaining portion of alkali component in adduct is similarly neutralized to a pH value of around pH 7–10. Cellulose made from cellulose aged by oxygen gas or air is preferably used as a starting material of alkali cellulose and the addition reaction can be carried out at 50–100° C. without any diluent or in the presence of hydrophilic organic solvents. If the addition of propylene oxide is carried out at temperatures below 50° C., not only does it take a long time to complete the reaction but also the hydroxypropyl cellulose produced has the tendency to be of inferior solubility in organic solvents and when the addition is carried out at temperatures above 100° C., homogeneous reaction never occurs and a side reaction results and consequently, by-products which deteriorate the produced hydroxypropyl cellulose with coloring are produced and solubility of the hydroxypropyl cellulose becomes poor.

Hydrophilic organic solvents such as acetone, tetrahydrofuran and tertiary-butyl alcohol can be optionally employed as diluents in the addition reaction and they are preferably used in quantities of not more than the volume of dried alkali cellulose. Propylene oxide is also a good diluent and if desired more than about 30% of total propylene oxide can be added as a diluent before the reaction. In semi-neutralization, organic or inorganic acids having weak acidity such as acetic acid, citric acid, malic acid, tartaric acid, phosphoric acid, phosphorous acid and hypophosphorous acid can be preferably employed and more preferably 10–70% of an aqueous solution of such weak acid is added into the adduct in order to avoid an increase of water in the reaction system and to promote a homogeneous neutrailzation. When strong acids such as sulfuric acid, nitric acid and glacial acetic acid are employed for the neutralization, the produced hydroxypropyl cellulose may deteriorate in solubility in organic solvents. The resultant reaction mixture of this invention can be purified by conventional method. However another method can be preferably employed in this invention.

In order to explain the purification process, FIG. 1 diagrammatically shows an example of an apparatus and process streams in their simplest form. In the drawing, the resultant reaction mixture containing impurities of salts corresponding to 3–4% of ash is dissolved into cold water at temperature below 50° C. and the aqueous solution is sticked in pool vessel 1. Then the solution is pumped up to the top 2 of a cleaning tower 3 and is poured into contacting zone 4 of the tower through nozzles 5 having aobut 1-3 mm. holes in diameter. Water heated above 85° C. is supplied from an inlet cock 6 and goes upward to outlet cock 7. A flow rate for the water is preferably chosen as 2-4 cm./sec. in the contacting zone 4 and a flow rate of more than 4 cm./sec. may cause floating up of the hydroxypropyl cellulose gel. The poured aqueous solution of hydroxypropyl cellulose changes into gel by contacting with hot water above 85° C. and the gel falls down through the contacting zone 4 in the shape of thread, string or noodle. While falling down in the contacting zone 4, the gell is countercurrently rinsed or washed with the hot water. The contacting zone 4 is heated with a steam jacket 8 in order to keep water above 85° C. in the zone 4. The gel falling down through contacting zone 4 piles up in a cooling zone 9 situated under the contacting zone 4.

The cooling zone is cooled with refrigerant in brine jacket 10 and the piling gel is cooled and dissolves into cold water in the cooling zone 9 and becomes concentrated solution. The solution is drawn off through a pipe 11 and if the solution of hydroxypropyl cellulose is not purified to the extent of a desired grade it can be returned into top of cleaning tower in order to repeat the purification. The solution can, if desired, be purified again by using another cleaning tower which is connected in series as outlined in FIG. 2. The solution can be concentrated more than 30% in the cooling zone 9 even if the solution of raw hydroxypropyl cellulose in pool vessel 1 is diluted below 30%. Powder of hydroxypropyl cellulose can be easily obtained from the aqueous solution removed from the cooling zone 9 so that after evaporating the solution there is a residue. Or if desired centrifugal separation can be carried out of gel which has been formed by heating the solution. The hydroxypropyl cellulose so obtained is dried and ground to powder. In our invention oxidation bleaching agents such as aqueous hydrogen peroxide or sodium hypochlorite can be optionally used in purification as decoloring agents.

The hydroxypropyl cellulose, which is made in our invention and having 6-20 of PO/glucose mole ratio, preferably have 10-16 of PO/glucose mole ratio, has good solubility properties for cold water and various kinds of organic solvents. For instance, the hydroxypropyl cellulose having a PO/glucose mole ratio of 8 in the present invention is soluble in iso-propyl alcohol and tertiary-propyl alcohol in spite of the fact that hydroxypropyl cellulose which is made according to the prior art method and has the same PO/glucose mole ratio is insoluble in such organic solvents. Further, the hydroxypropyl cellulose can be purified and contents of salts in the hydropropyl cellulose can be diminished to less than 0.3% for high yields of the hydroxypropyl cellulose.

The invention is illustrated by the following examples wherein all parts and percentages are given in terms of weight unless otherwise indicated.

EXAMPLE 1

100 parts of dissolving pulp were soaked into 20% of aqueous sodium hydroxide solution for 30 minutes at 20-30° C. After pressing and shredding the pulp, it was aged for 48 hours in air at 40-45° C. The alkali cellulose obtained is fed into a kneader type stainless steel reactor and after the atmosphere in the reactor was replaced with $N_2$ gas, 30 parts of tetrahydrofuran were introduced and 337 parts of propylene oxide were intermittently or continuously fed into the reactor at 60-65° C. and the mixture was mixed for 2 hours.

After mixing for 2 hours 80% of the alkali component of the alkali cellulose was neutralized with 20% of acetic acid. 113 parts of propylene oxide were further introduced continuously and the mixture was mixed for 5 hours. After the reaction, the reaction mixture was dissolved into 1400 parts of water and the pH was adjusted to pH by adding acetic acid.

In the purification step, an apparatus which has two cleaning towers connected in series as shown in FIG. 2 was used. The tower has 260 cm. of contacting zone, 60 cm. of cooling zone, 10.5 cm. in diameter and nozzles with 9 holes having 0.8 mm. in diameter. Hot water was introduced into an inlet cock 12 and taken out from outlet cock 13 in the first cleaning tower A and the purification was repeated at the second cleaning tower B. The water in contacting zone was kept at 85-90° C. in the cooling zone was 30-35° C. The resultant solution was fed into pool vessel 14 and poured into contacting zone 15 in the second cleaning tower B at a rate of 0.5 l./min. through the nozzle 16. Thread-like gel fell down to a cooling zone 17 through a contacting zone 15 and piled in the bottom of cooling zone and dissolved in cold water. The solution was taken out from the bottom and sent to the first cleaning tower A through pump ($P_2$).

The same treatment for the solution was repeated in the first tower A and the hydroxypropyl cellulose obtained was evaporated and after grinding, fine powder was obtained having 0.2% of residual salts (converted to $Na_2SO_4$) in a yield of 98.2%. The hydroxypropyl cellulose obtained was homogeneous and completely dissolved in various organic solvents without insoluble particles and viscosity of 2% aqueous solution at 20° C. was 5 centipoises. The solubilties of the gained hydroxypropyl cellulose were shown in Table 1.

TABLE 1

| Hydroxy-propyl cellulose. | Transparency * (percent) or solubility | | | | |
|---|---|---|---|---|---|
| | Water | Methyl alcohol. | Ethyl alcohol. | Isopropyl alcohol. | Tertiary-propyl alcohol. |
| Our invention | Over 80 | Over 80 | Over 90 | Over 88 | Over 88. |
| Contrast A ** | 48 | 60 | Gelatinous. | Insoluble | Insoluble. |
| B *** | 50 | 65 | do | do | Do. |

* Transparency (percent): That was measured at 10% solution by light having 430 mµ wave length.
** Hydroxypropyl cellulose: Which was made in a previous method in which total propylene oxide was added without semi-neutralization.
*** Hydroxypropyl cellulose: Which was made in a method in which total propylene oxide was added after neutralization without semi-neutralization.

EXAMPLE 2

Example 1 was repeated except that the PO/glucose mole ratio was changed.
The results of solubilities are shown in Table 2.

TABLE 2

[PO/glucose mole ratio is 14]

| | | Total propylene oxide parts is 14 (parts fed) | | Transparency (solubility) | |
|---|---|---|---|---|---|
| | | Before neutralization. | After neutralization. | Water | Isopropyl alcohol and tertiary-butyl alcohol. |
| Our invention | 1 | 2 | 12 | Good | Good. |
| | 2 | 3.5 | 10.5 | Better | Better. |
| | 3 | 7 | 7 | Best | Best. |
| | 4 | 10.5 | 3.5 | do | Do. |
| | 5 | 13.0 | 1 | Good | Gelatinous. |
| Contrast | C | 14 (Total parts) | 0 | Good | Insoluble. |
| | D | 16 (Total parts) | 0 | do | Do. |
| | E | 20 (Total parts) | 0 | do | Do. |

"Best" means clear solution in which any dimness can be detected with the naked eye.
"Better" means clear solution in which dimness can be detected with the naked eye.
"Good" means solution which does not involve insoluble particle but is apparently cloudy.

EXAMPLE 3

Example 1 was repeated except that the PO/glucose mole ratio was 14, 50% of alkali component of the alkali cellulose was neutralized in semi-neutralization and concentration of acetic acid was changed.
The solubilities oft he hydroxypropyl cellulose obtained are shown in Table 3.

TABLE 3

| Hydroxypropyl cellulose | | Parts fed | | Concentration of acetic acid (percent) | Transparency* | |
|---|---|---|---|---|---|---|
| | | Before neutralization | After neutralization | | Water | Isopropyl alcohol and tertiaty-butylalcohol |
| Our invention | 21** | 8 | 6 | 60 | Best | Best |
| | *** | 8 | 6 | 60 | do | Do. |
| | 3** | 7 | 7 | 50 | do | Do. |
| | 4** | 6 | 8 | 20 | do | Do. |
| Contrast | 1** | 7 | 7 | Glacial (100) | Best | Good. |
| | 2*** | 7 | 7 | Glacial (100) | Best | Good. |

* Stated in Example 2.
** Unaged pulp of 95,000 of average molecular weight was used.
*** Aged pulp of 30,000 of average molecular weight was used.

EXAMPLE 4

Example 1 was repeated except that the PO/glucose mole ratio and the ratio of neutralized alkali component in semi-neutralization were changed.

The results are shown in Table 4.

TABLE 4
[PO/glucose mole ratio is 8]

| | | Total propylene parts is 8 (parts fed) | | Ratio of neutralized alkali component in mid neutralization (percent) | Transparency* (solubility) | |
|---|---|---|---|---|---|---|
| | | Before neutralization | After neutralization | | Water | Isopropyl alcohol and tertiary-butyl alcohol |
| Our invention | 1 | 2.7 | 5.3 | 90 | Suspension | Suspension. |
| | 2 | 2.7 | 5.3 | 80 | Better | Better. |
| | 3 | 2.7 | 5.3 | 70 | do | Do. |
| | 4 | 2.7 | 5.3 | 60 | Good | Gelatinous. |
| Contrast | F | 8 | 0 | | Suspension | Suspension. |
| | | 9 (Total) | 0 | | do | Do. |
| | | 10 (Total) | 0 | | do | Do. |

* Stated in Example 2.

EXAMPLE 5

Example 1 was repeated except phosphoric acid was used for neutralization and the nozzle was changed.

The results of the purification are shown in Table 5.

| | | Nozzle | | Ratio of used hot water* | Content of impurities (percent) | Yield (percent) |
|---|---|---|---|---|---|---|
| | | Number of holes | Diameter of the holes (mm.) | | | |
| Our invention | 1 | 1 | 10 | 40 | 0.82 | 98.8 |
| | 2 | 9 | 0.5 | 2 | 0.30 | 98.3 |
| | 3 | 5 | 2 | 5 | 0.21 | 98.3 |
| | 4 | 9 | 1 | 5 | 0.20 | 98.2 |

* The ratio = $\dfrac{\text{weight of used hot water}}{\text{weight of purified hydroypropyl cellulose}}$

We claim:
1. A process of preparing hydroxypropyl cellulose from alkali cellulose and propylene oxide, comprising:
(a) reacting alkali cellulose and propylene oxide by feeding between 20% to 80% of 6 to 20 moles of propylene oxide per one glucose unit of cellulose in the presence of an organic solvent selected from the group consisting of acetone, tetrahydrofuran, propylene oxide and tertiary-butyl alcohol in quantities from zero to not more than the same volume of the presented alkali cellulose;
(b) neutralizing 60% to 90% of the total alkali in the adduct with an acid having weak acidity which is selected from the group consisting of acetic acid, citric acid, malic acid, tartaric acid, phosphoric acid, phosphorous acid and hypophosphorous acid;
(c) continuing the hydroxyalkylation by feeding propylene oxide in the adduct to the extent of the total amount of 6 to 20 moles of propylene per one glucose unit of cellulose;
(d) neutralizing the remaining alkali in the adduct to a pH of from 7 to 10 with an acid selected from said group; and,
(e) purifying the hydroxypropyl cellulose by introducing a cold aqueous solution of the hydroxypropyl cellulose under 50° C. through a nozzle into an upper vertical elongated vessel, in which hot water of more than 85° C. is flowing upwardly making stringy gel and dropping down the gel through the vessel contacting the hot water which is flowing countercurrently in order to wash the gel continuously, piling the gel in cold water and tartaric acid, dissolving the piled gel into the cold water, withdrawing the cold water from the bottom of the vessel, repeating the foregoing purification steps one or more times by introducing the cold water containing hydroxypropyl cellulose withdrawn from the bottom of the vessel using at least another similar vertical elongated vessel, withdrawing the cold water from the bottom of said similar vessel and drying the hydroxypropyl cellulose.

(References on following page)

References Cited

UNITED STATES PATENTS

| | | | |
|---|---|---|---|
| 2,791,584 | 5/1957 | Anderson | 260—232 |
| 3,131,176 | 4/1964 | Klug | 260—231 |
| 3,131,177 | 4/1964 | Klug | 260—231 |
| 3,212,854 | 10/1965 | Betts et al. | 23—310 |
| 3,305,320 | 2/1967 | Weech | 23—270 |
| 3,342,805 | 9/1967 | Callihan | 260—232 |

DONALD E. CZAJA, Primary Examiner

R. W. GRIFFIN, Assistant Examiner

U.S. Cl. X.R.

106—189, 197 R; 260—232